(12) United States Patent
Amit et al.

(10) Patent No.: US 8,495,135 B2
(45) Date of Patent: Jul. 23, 2013

(54) PREVENTING CROSS-SITE REQUEST FORGERY ATTACKS ON A SERVER

(75) Inventors: Yair Amit, Tel Aviv (IL); Guy Podjarny, Ottawa (CA); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/889,300

(22) Filed: Sep. 23, 2010

(65) Prior Publication Data

US 2011/0225234 A1 Sep. 15, 2011

(30) Foreign Application Priority Data

Mar. 10, 2010 (CA) ...................................... 2694326

(51) Int. Cl.
*G06F 15/16* (2006.01)
(52) U.S. Cl.
USPC ........... 709/203; 709/225; 709/228; 709/229; 726/4; 726/9
(58) Field of Classification Search
USPC ......... 709/203, 201, 217–219, 225, 227–229; 380/255, 256, 257–266, 268, 270; 726/2–5, 726/9, 10, 26, 27
See application file for complete search history.

(56) References Cited

U.S. PATENT DOCUMENTS

| | | | |
|---|---|---|---|
| 6,970,933 B1 | 11/2005 | Masters | |
| 7,373,524 B2 | 5/2008 | Motsinger et al. | |
| 7,478,434 B1 * | 1/2009 | Hinton et al. | 726/27 |
| 2001/0037365 A1 * | 11/2001 | Montague et al. | 709/204 |
| 2002/0133720 A1 | 9/2002 | Sherman et al. | |
| 2002/0156905 A1 | 10/2002 | Weissman | |
| 2003/0005118 A1 * | 1/2003 | Williams | 709/225 |
| 2004/0030788 A1 | 2/2004 | Cimo et al. | |
| 2004/0049676 A1 * | 3/2004 | Dutertre et al. | 713/163 |
| 2007/0255821 A1 | 11/2007 | Ge et al. | |
| 2008/0115201 A1 | 5/2008 | Sturms et al. | |
| 2009/0064337 A1 | 3/2009 | Chien | |
| 2009/0077373 A1 * | 3/2009 | Kramer | 713/155 |
| 2010/0011215 A1 | 1/2010 | Lior et al. | |

(Continued)

OTHER PUBLICATIONS

Prabakaran, et al., "Identifying Robust Defenses for Login CSFR", Department of Computer Science, University of Illinois, Chicago. 6 pages.

(Continued)

Primary Examiner — Ruolei Zong
(74) Attorney, Agent, or Firm — Marcia L. Doubet

(57) ABSTRACT

Preventing Cross-Site Request Forgery (CSRF) security attacks on a server in a client-server environment comprises: embedding a nonce and a script in all responses from the server to the client, the script adapted for executing to add the nonce to each request from the client to the server; sending the response with the nonce and the script to the client; and verifying that each request from the client includes the nonce. The script preferably modifies all objects, including dynamically generated objects, in a server response that may generate future requests to the server to add the nonce to the requests. The server verifies the nonce value in a request and optionally confirms the request with the client if the value is not the same as the value previously sent by the server. Server-side aspects might be embodied in the server or a proxy between the server and the client.

12 Claims, 10 Drawing Sheets

U.S. PATENT DOCUMENTS

2010/0088761 A1 4/2010 Podjarny et al.
2011/0055391 A1* 3/2011 Schneider .................... 709/225
2011/0321168 A1 12/2011 Amit et al.
2012/0180128 A1 7/2012 Amit et al.

OTHER PUBLICATIONS

Barth, et al., "Robust Defenses for Cross-Site Request Forgery", Proceedings of the 15th ACM Conference on Computer and Communications Security (2008), ACM. 13 pages.

Klein, Amit, "DOM Based Cross Site Scripting or XSS of the Third Kind", WASC Writeup (Jul. 2005), Web Application Security Consortium, retrieved from http://www.webappsec.org/projects/articles/071105.shtml on Jan. 12, 2009. 7 pages.

Yair Amit et al., U.S. Appl. No. 13/411,608, filed Mar. 4, 2012, Office Action, Jun. 6, 2012, 14 pages.

Yair Amit et al., U.S. Appl. No. 12/825,290, filed Jun. 28, 2010, Office Action, Jul. 31, 2012, 32 pages.

Yair Amit et al., U.S. Appl. No. 13/411,608, filed Mar. 4, 2012, Office Action, Nov. 9, 2012, 21 pages.

Yair Amit et al., U.S. Appl. No. 12/825,290, filed: Jun. 28, 2010, Office Action, Mar. 5, 2013, 37 pages.

Canadian Counterpart Application 2,694,326, Office Action dated Jan. 13, 2011 (3 pages).

Atwood, "Preventing CSRF and XSRF Attacks", Coding Horror, Oct. 14, 2008, p. 1-26.

Prabakaran, et al., "Identifying Robust Defenses for Login CSRF", Department of Computer Science, University of Illinois, Chicago. May 2009. 6 pages.

* cited by examiner

PREVENTING CROSS-SITE REQUEST FORGERY ATTACKS ON A SERVER

CROSS REFERENCE TO RELATED APPLICATIONS

This application claims priority of Canadian Patent Application Serial No. 2694326 entitled "A Method and System for Preventing Cross-Site Request Forgery Attacks on a Server", filed on Mar. 10, 2010.

BACKGROUND

The present invention relates generally to computer security, and more particularly, to preventing Cross-Site Request Forgery (CSRF) security attacks on a server.

Security attacks on networked computers are a major concern for both business enterprises and individual users as their computers are increasingly using public networks such as the Internet to access data servers. As a client computer requests data from a server through the Internet, information about the client computer and its user might be obtained by an attacking computer if there are security exposures in the networks or in the client and server computers. Using illegitimately obtained data, the attacker may submit a forged request to the same server that the client is communicating with on the client's behalf, without the client or user being aware of it. The server would receive and process the forged request, and return the requested data as normal because it does not know that the request was forged and not intended by the user. Such a server-side security attack is referred to as a Cross-Site Request Forgery (CSRF) attack.

A Cross-Site Request Forgery attack might be sent through inline objects such as Iframes and Images in JavaScript® programs that automatically send data requests or post forms to the server. ("JavaScript" and "Java" are registered trademarks of Sun Microsystems, Inc. in the United States, other countries, or both.) The attack could cause serious damage to both the server and the client, depending on the intent of the attacker. The server is unable to distinguish a forged request sent by the attacker from a legitimate one intended by the user and would proceed to act on the forged request, such as withdrawing funds from the user's bank account. The forged request might also direct the server to modify the server's data that in turn affect other users who access the same server.

A possible solution for minimizing the Cross-Site Request Forgery (CSRF) attacks is to make a client request non-predictable by introducing a random value to the vulnerable link or form action and expect to see that value when the request is submitted. This makes the request impossible for the attacker to predict, and as a result, minimizes the chance of attacks. However, this solution requires the relevant code to be changed and is costly to implement, especially when dealing with legacy or third-party applications or when the application code is unavailable or difficult to modify.

BRIEF SUMMARY

The present invention is directed to preventing Cross-Site Request Forgery security attacks on a server in a client-server environment. In one aspect, this comprises: embedding a nonce and a script in a response from the server to the client wherein, when executed, the script adds the nonce to each request from the client to the server; sending the response with the nonce and the script to the client; and verifying that each request from the client includes the nonce sent by the server. According to a preferred embodiment, the script modifies all components in a server response (such as XML and JavaScript objects) that may result in future requests to the server to add the nonce to the requests. The modification of the components may include changing the context in which the objects in a response are loaded into a client application that might result in the future requests. Aspects of the invention may be embodied, for example, in the server or a proxy between the server and the client that is capable of intercepting and modifying the client requests and server responses.

In another aspect of the invention, a system is provided for preventing CSRF security attacks on a server by client requests without a user's knowledge. The system preferably embeds a nonce and a script in a server response to the client wherein, when executed, the script adds the nonce to each client request to the server; sends the response with the nonce and the script from the server to the client; and verifies that every request from the client includes the nonce previously sent by the server. According to a preferred embodiment, as a server response is processed by the system, the embedded script modifies all objects in the server response that may result in further data requests to the server to add the nonce to the requests.

In yet another aspect of the invention, a computer program product prevents CSRF security attacks. The computer program product preferably comprises a computer usable storage medium having readable program code embodied in the storage medium to: embed a nonce and a script in a response from the server to the client wherein when executed the script adds the nonce to each request from the client to the server; send the response with the nonce and the script to the client; and verify that each said request from the client includes the nonce sent by the server. According to a preferred embodiment, the script modifies all components in the server response that may result in future client requests to the server to add the nonce to these requests.

The details of the preferred embodiments of the invention, both as to its structure and operation, are described below in the Detailed Description section in reference to the accompanying drawings, in which like reference numerals refer to like parts. The Brief Summary is intended to identify key features of the claimed subject matter, but it is not intended to be used to limit the scope of the claimed subject matter.

DETAILED DESCRIPTION

Figure 1:
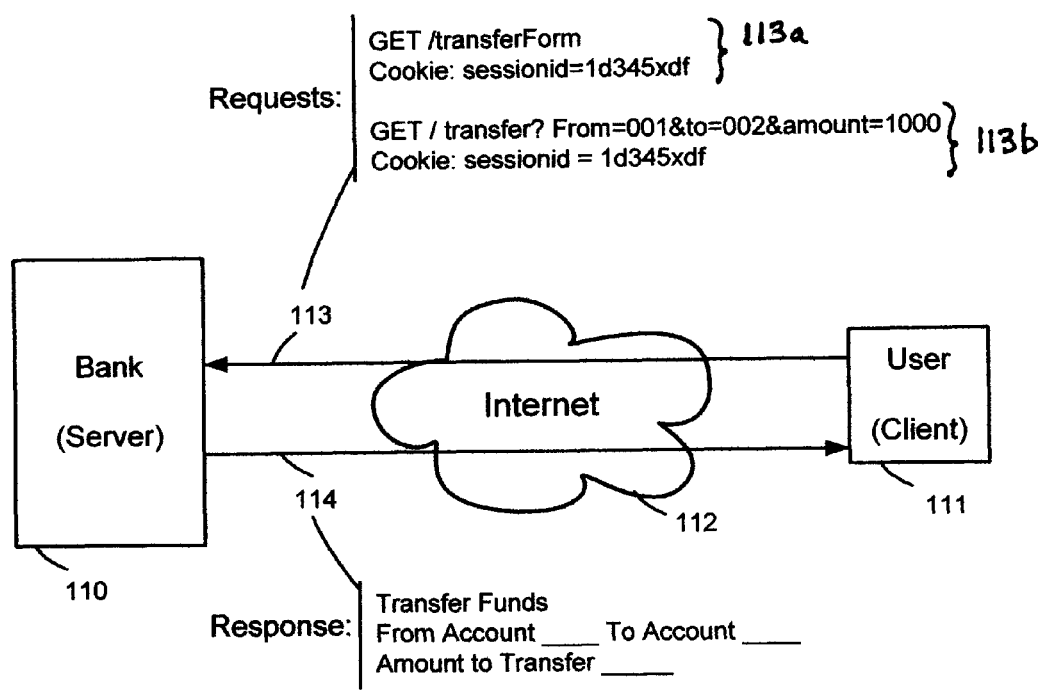
FIG. 1 is a block diagram illustrating a client-server environment in which aspects of the invention may be embodied.

The present invention relates generally to computer security. More specifically, the present invention relates to preventing Cross-Site Request Forgery security attacks in a client-server environment using a script embedded in a server response to add a nonce value to all future requests from the client to the server.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, JavaScript, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a diagram illustrating a typical client-server environment in which a bank customer (the user) accesses the bank's server computer 110, from a client computer 111 and through the Internet 112, to make a fund transfer between the user's accounts. The client 111 is typically a personal computer running a web browser application on top of a personal computer operating system. The server 110 might be a web server application hosted by a large web server computer. The Internet 112 typically includes applicable network router hardware and software on both ends of the Internet link to support network connection and communication through the Internet. (These latter components are omitted from FIG. 1 for the purpose of clarity.)

As shown by the transactions 113, the client 111 first sends a request 113a to the bank's server 110 with the command
  GET/transferForm
to download a fund transfer user screen, in response to the user's selecting the fund transfer function. The client request 113a generally includes a session cookie for the current network session between the client and the server, which is "1d345xdf" in this example. The server 110 then returns a response 114 that includes a fund transfer form. The fund transfer form contains the relevant fields for the user to provide to the bank like the account to transfer the funds from, the account to transfer the funds to, and the amount of funds to be transferred. The user next enters the required information on the transfer form and initiates the transfer. At this point, a second request 113b is sent by the client 111 to the bank server 110' which includes the command
  GET/transfer?From=001&to =002&amount=1000
The request 113b instructs the bank to transfer $1,000 from account 001 to account 002 on the user's behalf.

Figure 2:
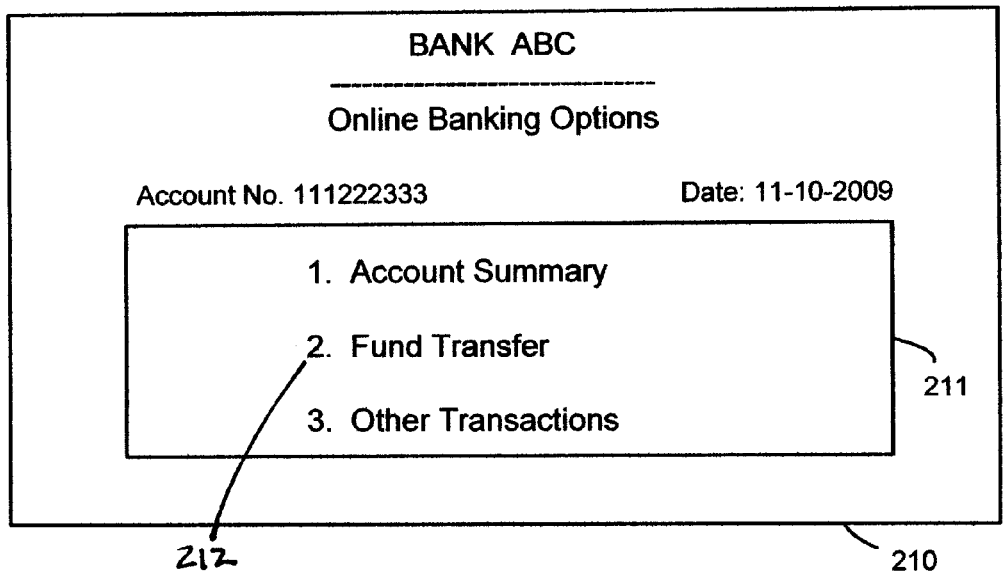
FIG. 2 is an example of a client application user screen on which a user could initiate a bank online fund transfer, which causes the client to send a request to the server for a fund transfer user screen.

FIG. 2 shows an exemplary user screen 210 with the online banking options 211 that a user typically sees at a client computer. Among the online banking options 211 is the option 212 for initiating a fund transfer request. As the user selects option 212, a request is sent from the client to the server to download a fund transfer form, as shown by the request 113a described above in reference to FIG. 1.

Figure 3:
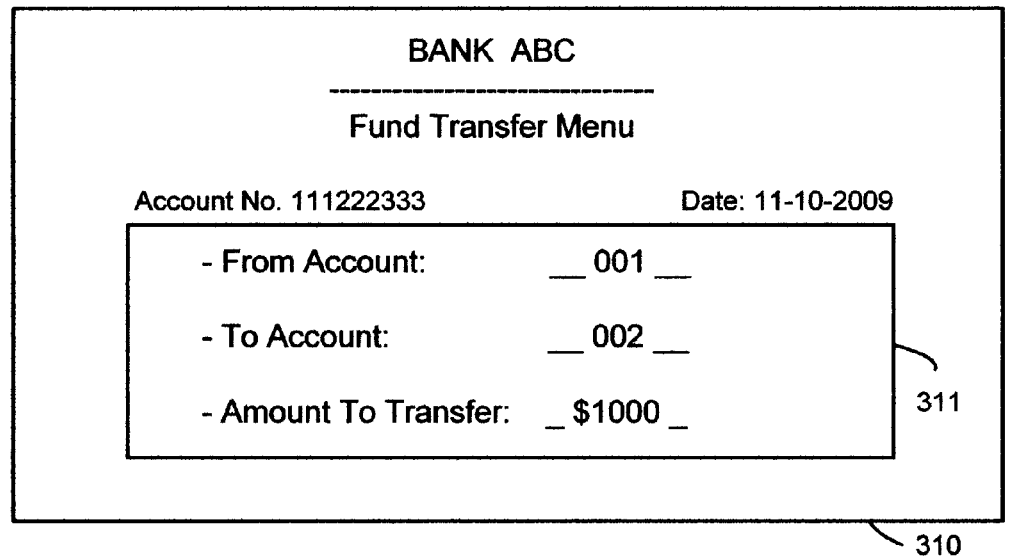
FIG. 3 is an exemplary fund transfer user screen that a server sends to the client, from which the client sends a request to the server to make the fund transfer per the user's initiation.

FIG. 3 illustrates an exemplary user screen 310 corresponding to the fund transfer form returned by the server. The fund transfer form was included in the server response 114 described above in reference to FIG. 1. The user screen 310 includes blank fields 311 for the user to enter the information needed for the fund transfer, such as the bank accounts involved and the amount to be transferred.

Figure 4:
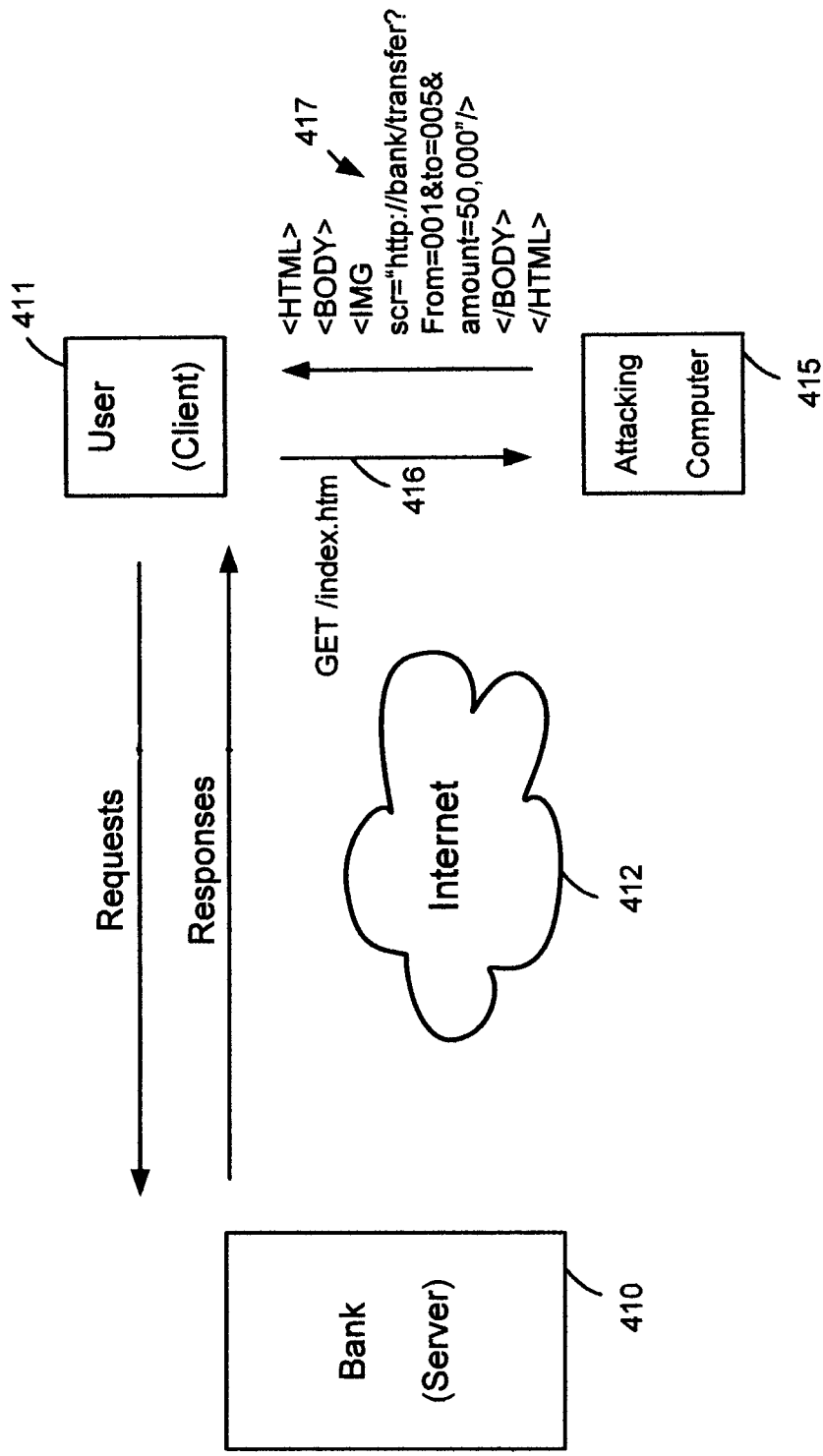
FIG. 4 is a block diagram illustrating an example of an attacking computer that obtains information from the client to generate a forged fund transfer request to the server on behalf of the user.
Figure 5:
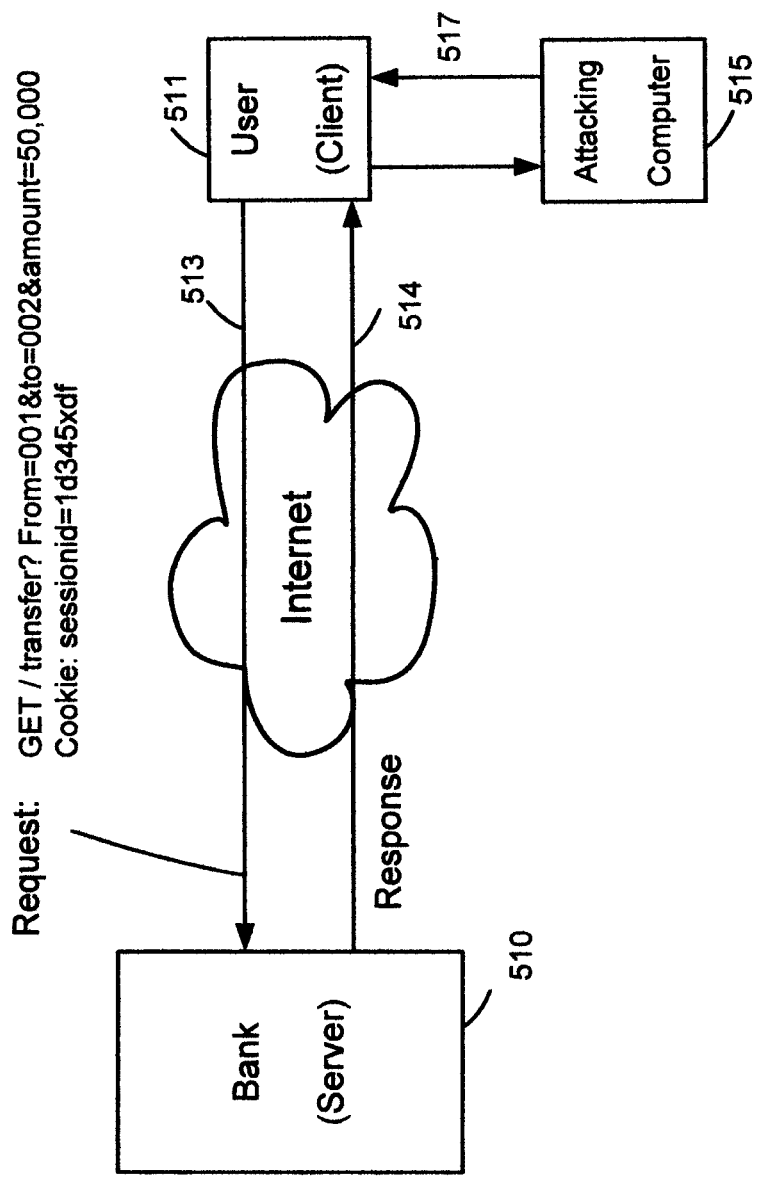
FIG. 5 is a block diagram showing an example of a forged fund transfer request sent by the attacker to the server, on the user's behalf and without the user's knowledge.

FIGS. 4 and 5 are block diagrams showing an example of a Cross-Site Request Forgery attack on the bank's server. In FIG. 4, as the client 411 and server 410 communicate with each other through the Internet 412, an attacking program already present in the client 411 might send relevant data about the client to an attacking computer 415 through a "GET/index.htm" command 416. The attacker might also intercept the communication between the server 410 and client 411 over the Internet 412 if there are security exposures in the networks between the client and the server or in the client and server computers themselves. From the obtained client data, the attacking computer 415 could generate a forged fund transfer request on behalf of the client 411 and send this request to the client 411. As an example, the forged request 417 might be for an instruction to the bank to transfer $50,000 from the user's account to another account controlled by the attacker. Once arriving at the client 411, the forged request 417 might be sent to the server 410 through inline objects such as Iframes, Images and JavaScripts that automatically send requests and post forms to the server 410 using the server's cookie that the client 411 currently maintains in its memory. The forged request 417 is made to the server 410 without the user's intention and knowledge.

Referring now to FIG. 5, upon receiving a forged request 517 from the attacking computer 515, the client 511 automatically sends a request 513 to the server 510 to transfer $50,000 as directed by the attacker. The server 510 would not be able to distinguish whether this request was intended by the user 511 or whether it has originated from the attacking computer 515. As a result, the server would accept the request 517 and process it as usual. The server 510 then transfers the funds as directed by the forged request 513 and acknowledges the transfer as shown by the response 514 to the client 511.

Figure 6:
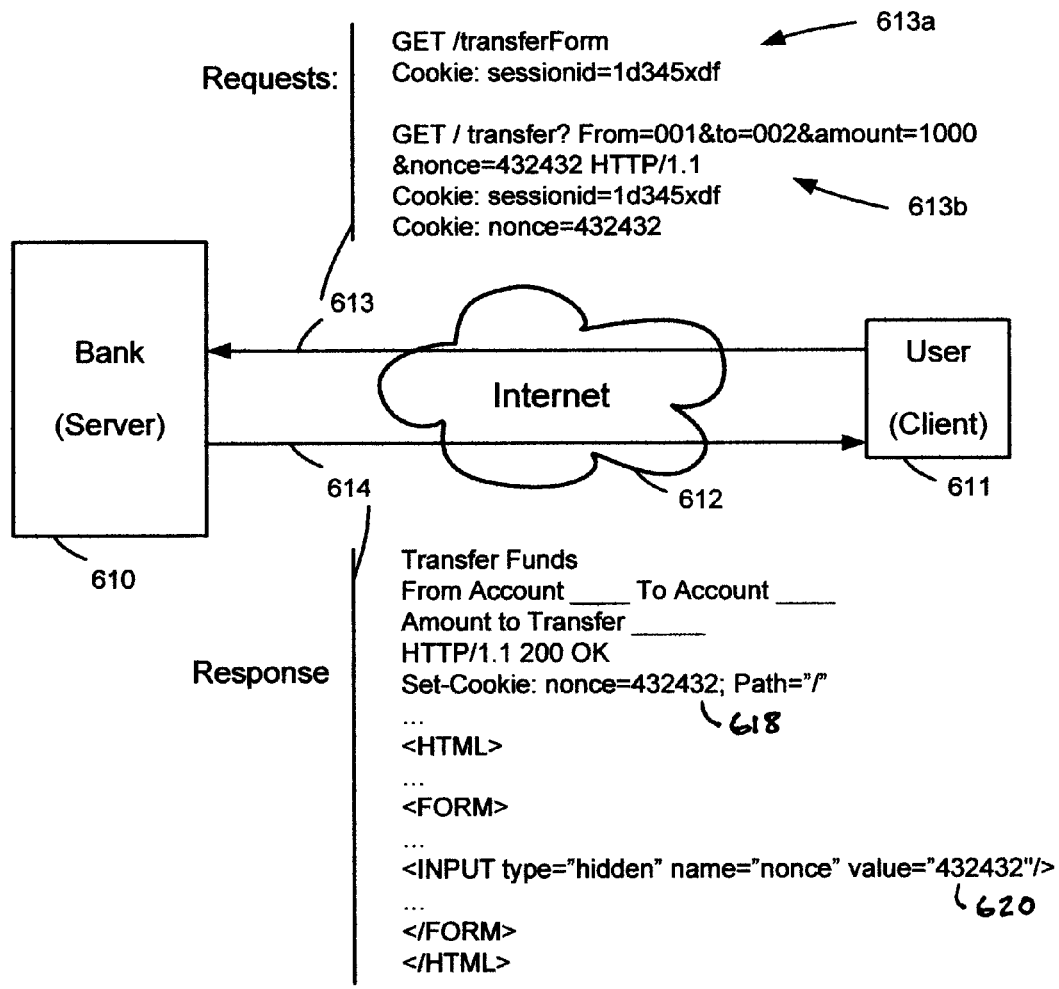
FIG. 6 is a block diagram illustrating the client requests and server response that include a script and a nonce to prevent Cross-Site Request Forgery attacks, in accordance with aspects of the invention.

FIG. 6 is a block diagram illustrating a client-server environment for a fund transfer transaction similar to the example described in FIG. 1, but which includes aspects of the invention to protect against Cross-Site Request Forgery attacks. As in the previous example, the user from a client computer 611 would like to make an online fund transfer with the bank. Upon selecting the fund transfer option in the client's web browser, a request 613a is sent to the bank's server 610 to download the fund transfer form. A response 614 is returned by the server 610 which includes the typical fields for the user to enter on a fund transfer screen, such as the bank account information and the funds amount to be transferred. In addition, the server 610 also includes in the response 614 a nonce and a script that, when executed by a client application, embeds the nonce in all future requests from the client 611 to the server 610. As an example, the value of the nonce in the response 614 is "432432" (see 620), which is the same nonce value in the session cookie (see 618). Further details on the operations performed at the client are described below in reference to FIG. 10.

The user next enters the bank account information and the transfer amount on the returned user screen. Upon the user initiating the transfer, a request 613b is sent from the client 611 to the server 610. The request 613b includes a nonce with the same value of "432432" that the server 610 has previously returned to the client 611. Based on the nonce value in the request 613b, which is identical to the nonce value previously provided by the server 610, the server knows that the request is a legitimate one from the client 611 and not a forged request from an attacker. The invention thus prevents a Cross-Site Request Forgery attack on the server 610 from client computers such as the client 611.

Figure 7:
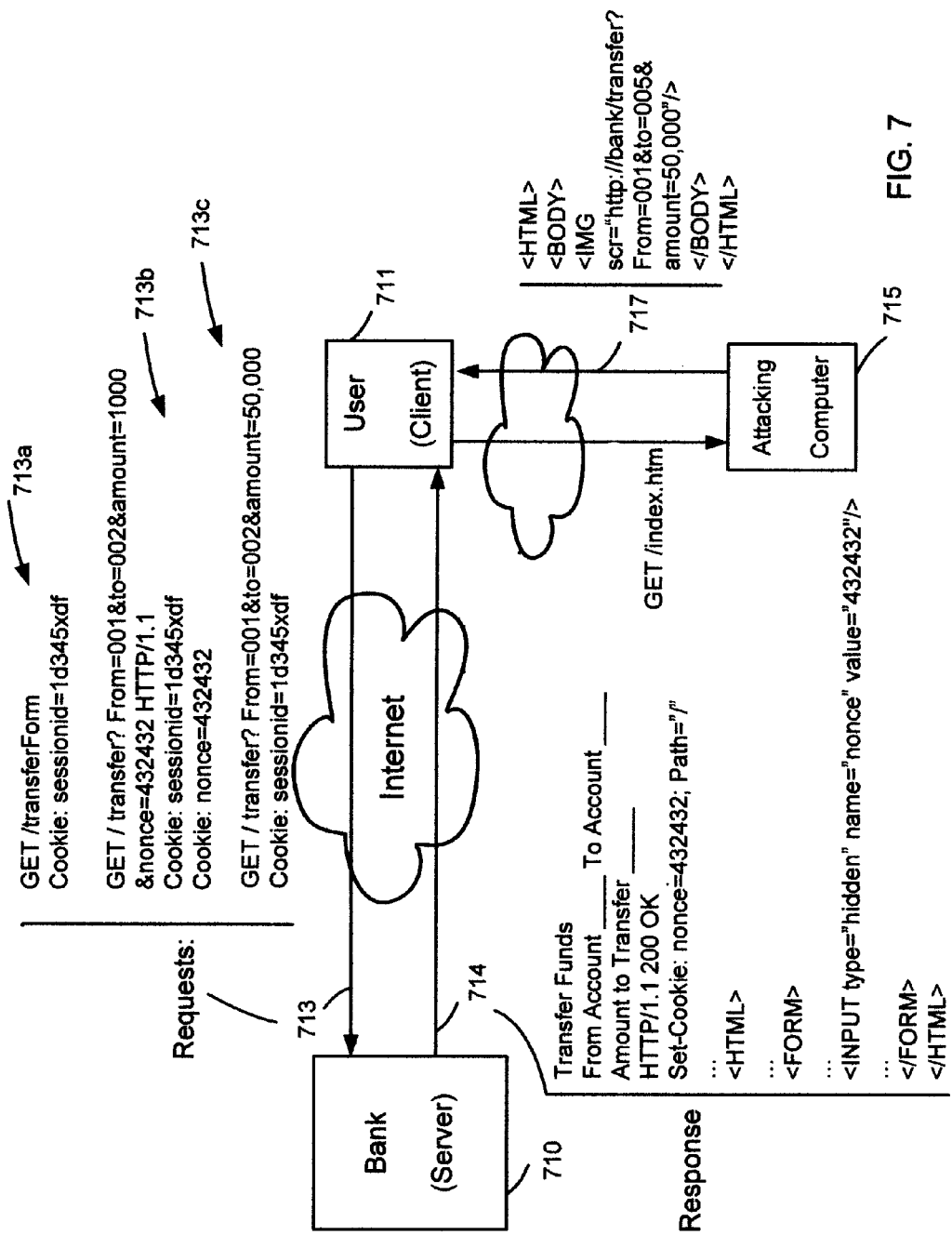
FIG. 7 is a block diagram showing an example of a forged fund transfer request sent by the attacker to the server, which will not be processed by the server because it does not have the server's nonce in the request.

FIG. 7 is a block diagram showing an example of a forged fund transfer request sent by an attacker to the server, which will not be processed by the server because the request does not include the nonce that the server has previously sent to the client. Similar to the example in FIG. 6, the client 711 and server 710 exchange requests 713a and 713b, and response 714, to make an online fund transfer as indicated in the request 713b. The attacking computer 715 initiates a forged request 717 that is sent to the client 711. The client 711 then forwards the attacker's forged fund transfer request to the server 710 as client request 713c. However, the forged fund transfer in the request 713c does not have the nonce "432432" that the server 710 has sent to the client 711 in the response

714. As a result, the server 710 would not process this request 713c. The Cross-Site Request Forgery protection embodied in the server 710 and client 711 has thus prevented the attacker 715 from making a forged client request.

Figure 8:
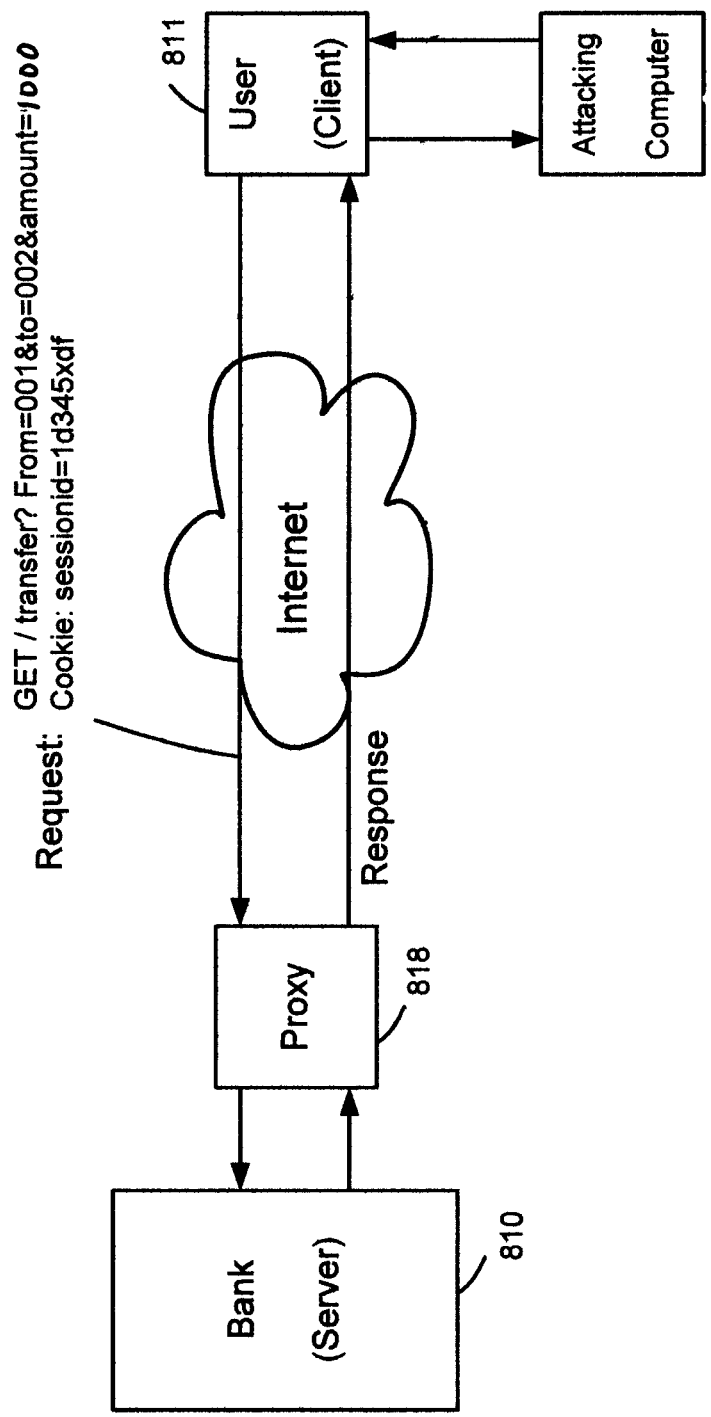
FIG. 8 is a block diagram illustrating a client-server environment with an exemplary proxy that embodies aspects of the invention.

FIG. 8 is a block diagram illustrating another exemplary embodiment of the invention in which the client-server environment has a proxy 818 on the server side and aspects of the invention, as described, are provided by the proxy 818 rather than by the server. As the client 811 and server 810 exchange requests and responses, these requests and responses are intercepted and examined by the proxy 818. The proxy 818 could then modify the client requests and server responses to include the nonce and the script as described.

Figure 9:
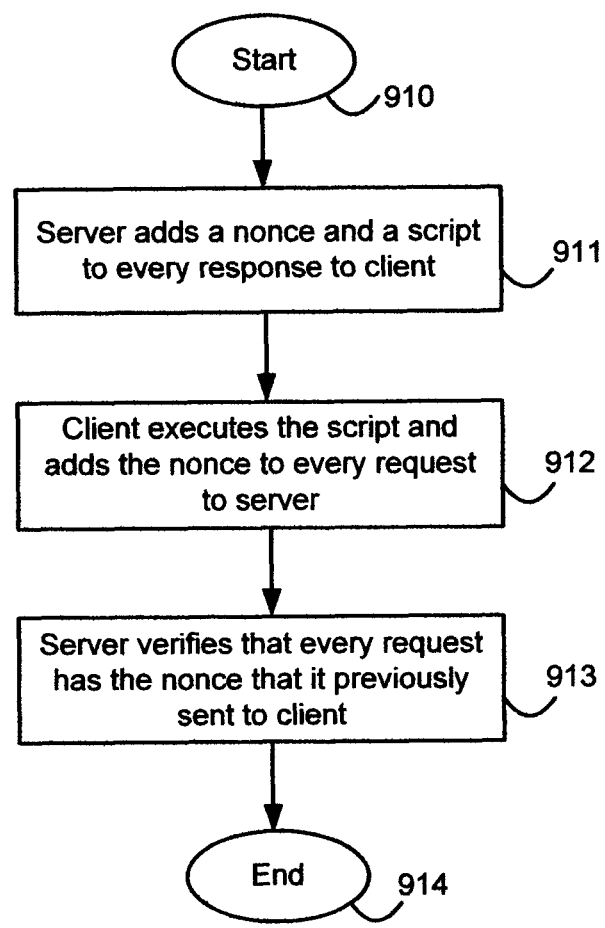
FIG. 9 is a flow chart representing a high-level process for preventing Cross-Site Request Forgery attacks in accordance with aspects of the invention.

FIG. 9 is a high-level flow chart representing an exemplary embodiment of a server-side process for preventing Cross-Site Request Forgery attacks on the server, in accordance with aspects of the invention. The process might be embodied at the server itself or in a proxy between the server and the client as illustrated in FIG. 8. For the purpose of describing the server-side process, an embodiment of the process in the server is used. The process starts at block 910. At block 911, the server embeds a nonce and a script in all the responses that it sends to a client in the current network session between the client and the server. The responses are returned to the client after the server processes the client requests, whether manually initiated by a user at the client computer or automatically generated from a client application. At step 912, upon receiving a server response with the nonce and script, the client application (a browser in this case) executes the script to include the nonce in all future requests that it will send to the server. At step 913, the server verifies that each request that it receives from the client includes the same nonce value that it has previously sent to the client before the request is processed.

Figure 10:
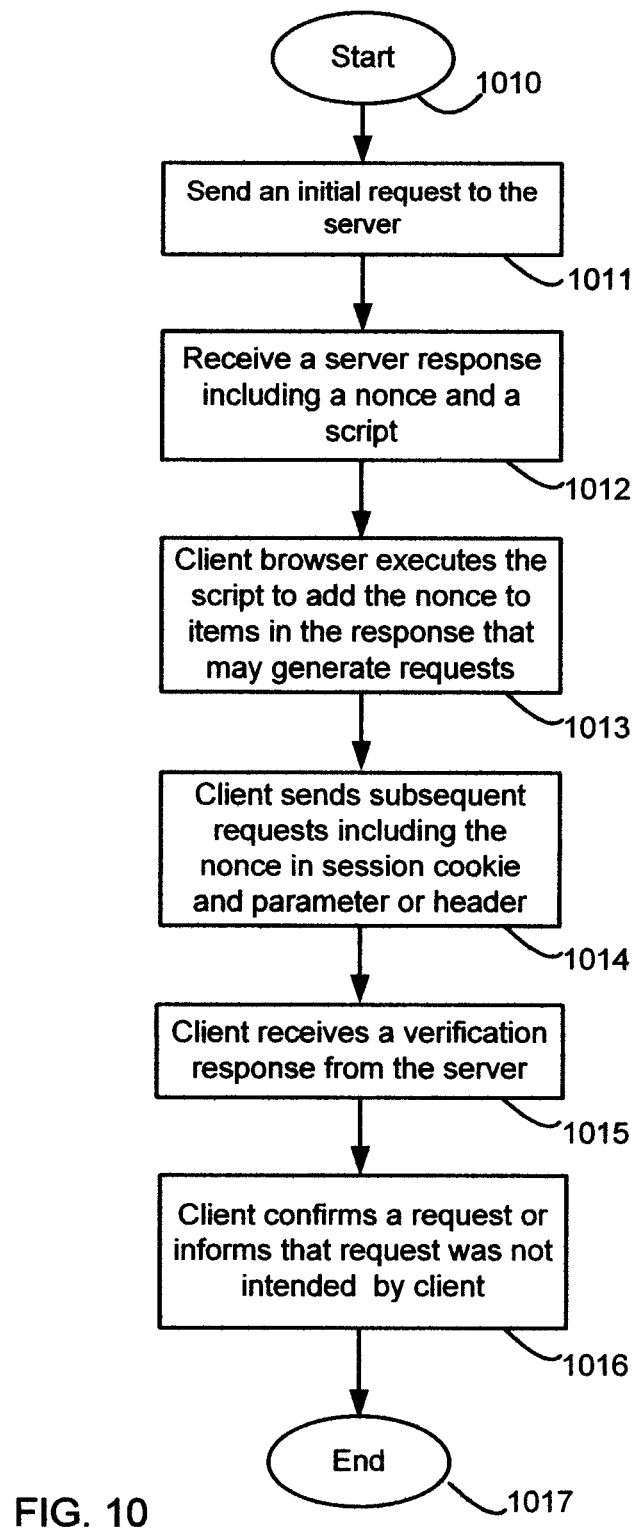
FIG. 10 is a flow chart representing exemplary operations on the client side for preventing Cross-Site Request Forgery attacks, in accordance with aspects of the invention.

FIG. 10 is a flow chart representing an exemplary embodiment of a client-side process for preventing Cross-Site Request Forgery attacks on a server, in accordance with aspects of the invention. The client-side process begins at block 1010. At block 1011, the client application sends an initial data request to the server. The server processes the request and returns a response, which the client receives at block 1012. The client application (e.g., a web browser) executes the returned script to add the nonce to all objects in the returned page that might generate later requests to the server, at block 1013. As the client application sends further data requests to the server, it includes the nonce sent by the server in the requests' session cookies and the requests' parameters or headers, as shown by block 1014. In some instances where the server is not certain that a request was intended by a user, the server sends a verification response to the client for a user to confirm the request. The verification response is received by the client at block 1015. The client then needs to confirm with the server whether it has in fact initiated the request, at block 1016. The client-side process terminates at block 1017.

When the script modifies a server response, e.g., an HTML page (or other markup language document) returned by the server, to include the nonce in all future requests, the changes sometimes are not to the page itself but to the context in which the page objects are loaded. For example, the script might set or change a cookie or modify an ActiveX® object like XMLHttpRequest. ("ActiveX" is a registered trademark of Microsoft Corporation in the United States, other countries, or both.) Some of the future requests are performed automatically by the browser when the page is loaded, e.g., images on the page, while others require a user action, e.g., the user moving a cursor over a menu and clicking a link. Some user actions trigger a reload of the entire page, such as the clicking of a link that navigates to the next page, while other actions modify parts of the page like the loading of an image on the page or the filling an Iframe form. Still other user actions are sent and consumed internally by the scripts on the page, such as when the user fills in a country field in a form. The scripts would fetch the provinces from the server and populate the options on another form field.

The scripts on the page can generate page contents dynamically, both at load time and as a response to events, such as when the user expands a section in a tree structure. Therefore, the update of all future actions to include the nonce is a repetitive process that needs to occur repeatedly even after the page is loaded, either in a cyclic fashion, e.g., every 5 seconds, or in response to events, e.g., whenever a new piece of content is written.

Actions on the page that result in future requests can be performed in many different ways, using many different technologies. In preferred embodiments of the invention, these requests include those made through common actions such as HTML elements, e.g., images, Iframes, links, HTML forms, and ActiveX controls. They also include browser add-ons with no user interface, such as XMLHttpRequests, which are invoked automatically from within scripts or in response to events, and ActiveX controls with a user interface, such as Adobe Flash®, Microsoft Silverlight®, Adobe Reader®, etc., which either go back to the hosting or originating page to make requests through it, or submit the HTTP requests themselves. ("Adobe Flash" and "Adobe Reader" are registered trademarks of Adobe Systems Incorporated in the United States, other countries, or both. "Silverlight" is a registered trademark of Microsoft Corporation in the United States, other countries, or both.)

Figure 11:
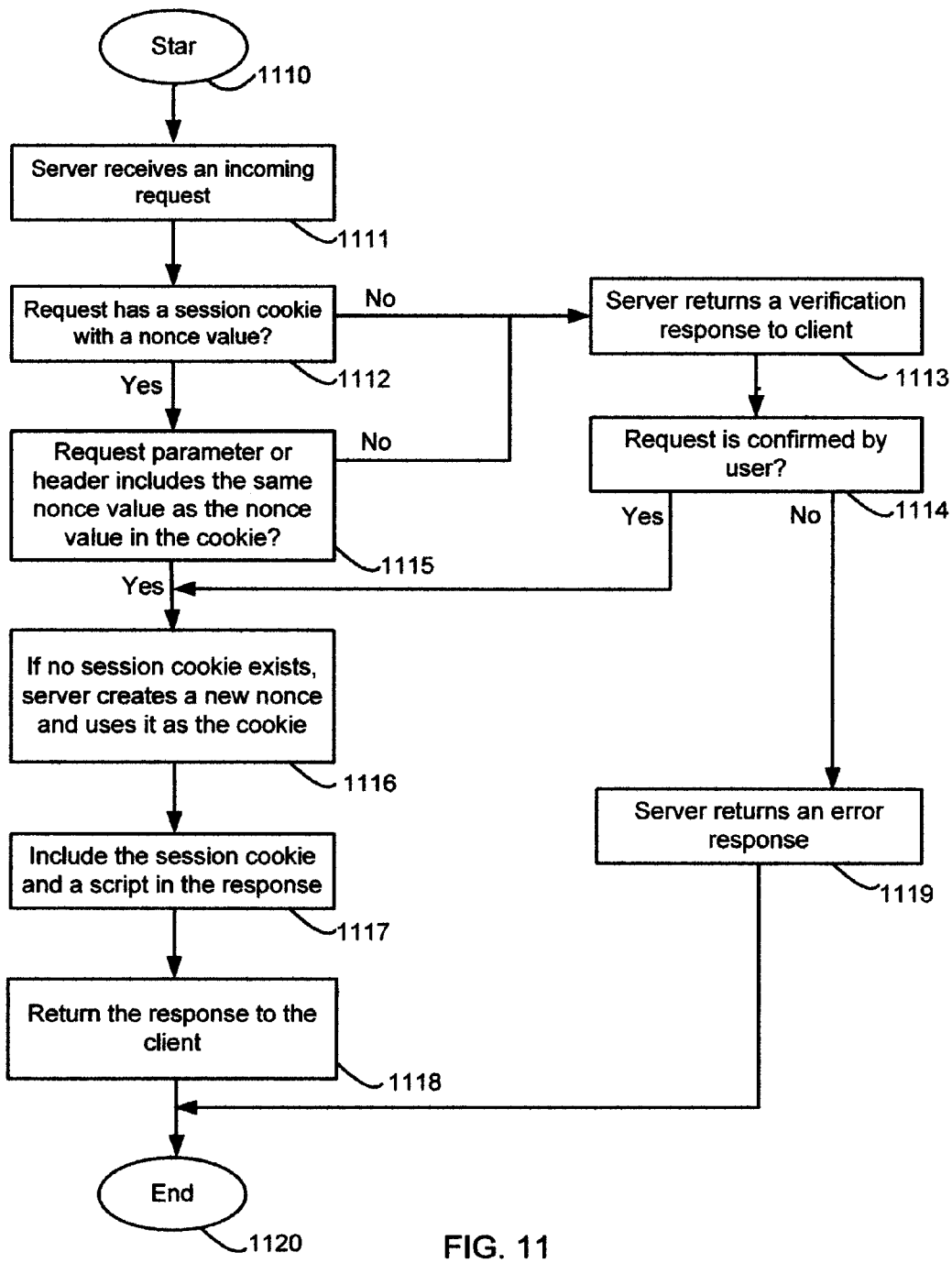
FIG. 11 is a flow chart representing exemplary operations on the server side for preventing Cross-Site Request Forgery attacks, in accordance with aspects of the invention.

FIG. 11 is a flow chart representing an exemplary embodiment of a server-side process for preventing Cross-Site Request Forgery attacks on the server, in accordance with aspects of the invention. The server-side process might be embodied in the server itself or in a server-side proxy capable of intercepting and modifying the requests and responses between the client and the server. The process begins at block 1110. At block 1111, the server receives an incoming request from the client. The server determines whether the request includes a session cookie and if so, whether the cookie includes a nonce value, at block 1112. If the result of this determination is positive, the server checks to see whether the request's header or one of its parameters includes the same nonce value as the value in the cookie, at block 1115. If the request does not have a session cookie or the included session cookie does not have a nonce, per the determination in block 1112, then the server sends a verification to the client to confirm the request, at block 1113. If the client confirms at block 1114 that it has initiated the data request to the server, then the process continues at block 1116. Otherwise, the server returns an error response to the server at block 1119. The request verification represented by blocks 1113-1114 is preferably optional to allow it to be deactivated as needed. The server-side process ends at block 1120.

At block 1115, if the client request's header or one of its parameters includes the same nonce value as the value in the cookie, then control of the process flows to block 1116 where the server checks if there is a session cookie for the current network session between the client and the server. If there is none, then the server creates a new nonce value and uses it as the session cookie. The server includes the session cookie and a script for handling the nonce in its response to the client at block 1117. The server next returns this response to the client at block 1118. The server-side process terminates at block 1120.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media (as has been discussed above).

The invention claimed is:

1. A system for preventing security attacks between a client and a server, comprising:
   a computer comprising a processor; and
   instructions which are executable, using the processor, to implement:
      embedding a nonce and a script in a server response to the client in a session, wherein the script is adapted such that when executed at the client following receipt of the response from the server, the script automatically adds the nonce to each future request sent from the client to the server in the session;
      sending the response with the nonce and the script embedded therein from the server to the client; and
      verifying that each future request received at the server from the client in the session includes the nonce, wherein:
         the embedding comprises creating a session cookie if a client request has no session cookie, the response includes the session cookie, and the session cookie includes the nonce;
         the client request comprises a parameter that includes the nonce; and
         the verifying comprises verifying that the nonce in the parameter is identical to the nonce in the session cookie;
      sending a verification response to the client, if the nonce in the parameter is not identical to the nonce in the session cookie, to confirm that the request was intended by a user; and
      processing the request if the request is confirmed as being intended by the user, otherwise rejecting the request.

2. The system of claim 1, wherein the script modifies all components in the server response that result in sending the future requests to the server, the modifying comprising embedding the nonce in the future requests.

3. The system of claim 1, wherein the client request is made through a browser and the browser automatically executes the script when the client processes the server response.

4. The system of claim 1, wherein:
   the client request comprises a header that includes the nonce sent by the server; and
   the embedding verifies that the nonce in the header is identical to the nonce in the session cookie.

5. The system of claim 1, wherein the embedding rejects the client request if the nonce in the parameter is not identical to the nonce in the session cookie.

6. The system of claim 1, wherein the embedding operates at the server.

7. The system of claim 1, wherein the embedding operates at a proxy capable of intercepting and modifying the client requests and the server responses.

8. The system of claim 1, wherein the script is adapted such that the client executes the script using standard script processing functionality of a browser that operates at the client for processing the server response.

9. A computer program product for use with a client and a server to prevent security attacks, the product comprising a non-transitory computer readable storage medium having computer readable program code embodied in the storage medium, the program code operable to:
   embed a nonce and a script in a server response to the client in a session, wherein the script is adapted such that when executed at the client following receipt of the response from the server, the script automatically adds the nonce to each future request sent from the client to the server in the session;
   send the response, with the nonce and the script embedded therein, from the server to the client; and
   verify that each future request received at the server from the client in the session includes the nonce, wherein:
      the embedding comprises creating a session cookie if a client request has no session cookie, the response includes the session cookie, and the session cookie includes the nonce;
      the client request comprises a parameter that includes the nonce; and
      the verifying comprises verifying that the nonce in the parameter is identical to the nonce in the session cookie;
   send a verification response to the client, if the nonce in the parameter is not identical to the nonce in the session cookie, to confirm that the request was intended by a user; and
   process the request if the request is confirmed as being intended by the user, otherwise reject the request.

10. The computer program product of claim 9, wherein the script modifies all components in the server response that result in sending the future requests to the server, the modifying comprising adding the nonce to the future requests.

11. The computer program product of claim 9, wherein the client request is made through a browser and the browser automatically executes the script when the client processes the server response.

12. The computer program product of claim 9, wherein the script is adapted such that the client executes the script using standard script processing functionality of a browser that operates at the client for processing the server response.

* * * * *